(12) United States Patent
Dicken

(10) Patent No.: US 10,431,969 B1
(45) Date of Patent: Oct. 1, 2019

(54) SLIDING OUTLET WITH NO WIRE NUTS

(71) Applicant: Larry J. Dicken, Logan, OH (US)

(72) Inventor: Larry J. Dicken, Logan, OH (US)

( * ) Notice: Subject to any disclaimer, the term of this patent is extended or adjusted under 35 U.S.C. 154(b) by 0 days.

(21) Appl. No.: 16/246,348

(22) Filed: Jan. 11, 2019

Related U.S. Application Data

(63) Continuation-in-part of application No. 16/198,701, filed on Nov. 21, 2018.

(51) Int. Cl.
| | | |
|---|---|---|
| H01R 25/00 | (2006.01) |
| H02G 3/16 | (2006.01) |
| H02G 5/08 | (2006.01) |
| H01R 25/16 | (2006.01) |
| H02G 3/08 | (2006.01) |
| H02G 3/18 | (2006.01) |

(52) U.S. Cl.
CPC .............. *H02G 3/16* (2013.01); *H01R 25/006* (2013.01); *H01R 25/162* (2013.01); *H02G 5/08* (2013.01); *H02G 3/08* (2013.01); *H02G 3/18* (2013.01)

(58) Field of Classification Search
None
See application file for complete search history.

(56) References Cited

U.S. PATENT DOCUMENTS

| | | | | |
|---|---|---|---|---|
| 5,834,932 A * | 11/1998 | May | ...... | G01R 11/04 |
| | | | | 324/107 |
| 6,786,766 B1 * | 9/2004 | Chopra | ...... | H01R 4/4827 |
| | | | | 439/441 |
| 7,160,147 B1 * | 1/2007 | Stephan | ...... | H01R 9/24 |
| | | | | 174/60 |
| 9,564,725 B1 * | 2/2017 | Moss | ...... | H01H 23/04 |
| 9,899,819 B1 * | 2/2018 | Holloway | ...... | H02G 3/18 |
| 10,153,602 B2 * | 12/2018 | Wolfson | ...... | H01R 25/16 |
| 2006/0105626 A1 * | 5/2006 | Scott | ...... | H01R 9/2491 |
| | | | | 439/535 |
| 2014/0027143 A1 * | 1/2014 | Hunter | ...... | H02G 3/18 |
| | | | | 174/53 |
| 2016/0329669 A1 * | 11/2016 | Hestrin | ...... | H01R 13/73 |

\* cited by examiner

*Primary Examiner* — Tho D Ta

(74) *Attorney, Agent, or Firm* — Ronald J Koch

(57) ABSTRACT

A sliding outlet engages an outlet box having three bus bars, one for each of the hot, neutral, and ground wires of a three conductor wire. Extension portions of the sliding outlet achieve a friction fit to the bus bars so that the outlet is energized without the need for wire nuts.

3 Claims, 10 Drawing Sheets

SLIDING OUTLET WITH NO WIRE NUTS

The present application is a continuation in part of the patent application No. 16/198,701 of LARRY J DICKEN filed Nov. 21, 2018, entitled "Switch Boxes And Outlet Boxes With No Wire Nuts", and based on which priority is herewith claimed under 35 U.S.C. 120 and the disclosure of which is incorporated herein by reference in its entirety as if fully rewritten herein.

BACKGROUND AND SUMMARY

The subject technology relates generally to systems and methods of wiring outlet boxes or switch boxes, and specifically to the various ways outlets or switches are operatively connected to outlet boxes or switch boxes.

Conventional outlet boxes or switch boxes are problematic at least because wire nuts must be used to connect two wires to each other. For example, in a residential home wiring scheme, a series of wall outlets are sequentially connected in parallel. A three conductor (hot, neutral, ground) wire is inserted into an outlet box and connected to an outlet. In order to connect that outlet box to another outlet box, another three conductor (hot, neutral, ground) wire must be connected. This has conventionally been accomplished with wire nuts. The end result is a bulky and cumbersome group of wires and wire nuts that must be squeezed into the outlet box as the outlet is connected. Another problem with conventional systems relates to the use of wires between the junction box and outlet or switch being connected thereto. The subject technology solves these problems by eliminating the wire nuts by providing bus bars mounted inside of the outlet (or switch) box thereby allowing two separate three-conductor wires and the wires connecting the outlet (or switch) to be connected to bus bars, and additionally by providing the technology allowing for sliding engagement of the outlet or switch to the junction box. As shown in FIG. 9, the second three-conductor wire (shown in dashed lines) is easily connected to the bus bars without the need for wire nuts. As shown in FIG. 8A, a sliding outlet 30 slidingly engages outlet box 1 without the need for wires, and hence wire nuts.

REFERENCE NUMERALS IN DRAWINGS

Figure 1:
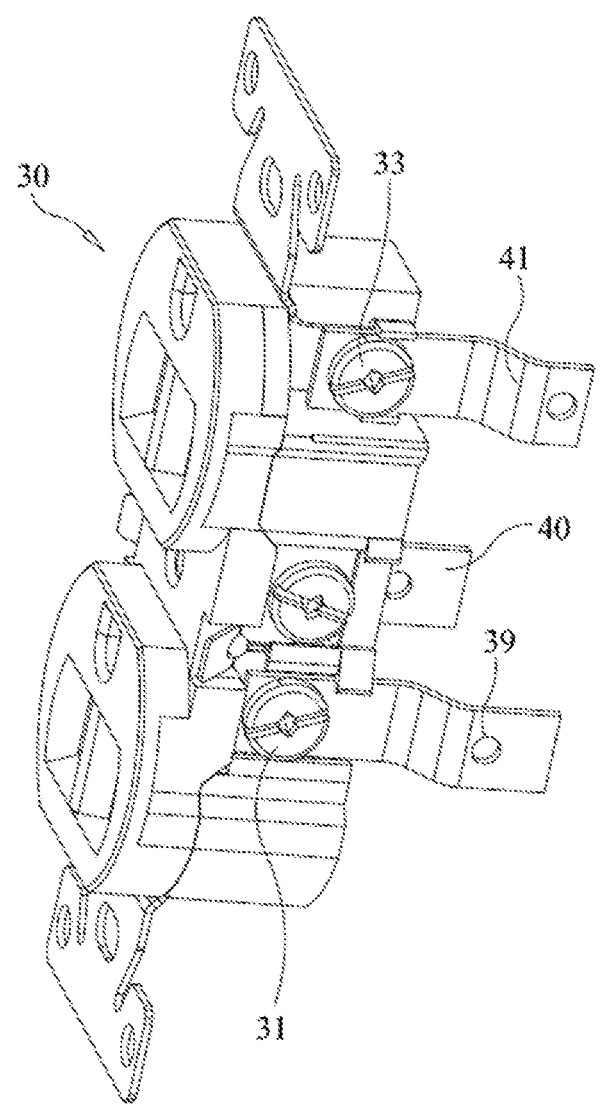
FIG. 1 Depicts a perspective view of an outlet 30 in one aspect of the subject technology FIG. 2 Depicts a perspective view of an outlet 30 in one aspect of the subject technology FIG. 3 Depicts a perspective view of enclosure 2 in one aspect of the subject technology FIG. 4 Depicts a block diagram of switch box or outlet box 1 connected to outlet or switch 30

The table below lists the reference numerals employed in the figures, and identifies the element designated by each numeral.

1 switch box or outlet box 1
2 enclosure 2
3 first bus bar 3
5 second bus bar 5
7 third bus bar 7
9 first aperture 9
11 second aperture 11
13 back wall 13 of enclosure 2
15 top wall 15 of enclosure 2
17 bottom wall 17 of enclosure 2
19 female socket 19
21 set screws 21
23 wire 23 (e.g. three conductor wire)
24 hot conductor 24 of three conductor wire 23
25 neutral conductor 25 of three conductor wire 23
26 ground conductor 26 of three conductor wire 23
30 sliding outlet 30 (aka electrical outlet)
31 first (e.g. hot) connector 31 of sliding outlet 30
32 second (e.g. neutral) connector 32 of sliding outlet 30
33 third (e.g. ground) connector 33 of sliding outlet 30
34 second hot conductor 34
35 second neutral conductor 35
36 second ground conductor 36
37 first bus bar extension 37
38 second bus bar extension 38
39 first (e.g. hot) connector extension 39 of sliding outlet 30
40 second (e.g. neutral) connector extension 40 of sliding outlet 30
41 third (e.g. ground) connector extension 41 of sliding outlet 30

DETAILED DESCRIPTION

In one aspect of the subject technology, a sliding outlet 30 comprises a first (e.g. hot) connector extension 39 secured to a first (e.g. hot) connector 31; a second (e.g. neutral) connector extension 40 secured to a second (e.g. neutral) connector 32; and a third (e.g. ground) connector extension 41 secured to a third (e.g. ground) connector 33. It is to be understood that the designation of "hot", "neutral", and "ground" is interchangeable according to various aspects of the subject technology and likewise first, second, and third bus bars 3, 5, 7 can be designated as hot, neutral, and ground according to different wiring schemes. In one aspect, first bus bar 3 is hot, second bus bar 5 is neutral, and third bus bar 7 is ground. In another aspect, first bus bar 3 is neutral, second bus bar 5 is hot, and third bus bar 7 is ground.

In one aspect, first (e.g. hot) connector 31, second (e.g. neutral) connector 32, and third (e.g. ground) connector 33 are all connected to sliding outlet 30 in a conventional manner. Such a conventional outlet is adapted in accordance with the subject technology to include connector extensions 39, 40, & 41. The various connector extensions described herein (e.g. hot connector extension 39) are connected (aka secured) to a connector (e.g. hot connector 31). It is to be understood that such connection can be releasable (e.g. via a mounting screw found on conventional outlets that are typically used to connect a wire) or fixed (e.g. welded or formed from a unitary piece of material).

In one aspect, the sliding outlet 30 is adapted to slidingly engage an outlet box 1, wherein the outlet box 1 consists of an enclosure 2, a first bus bar 3, a second bus bar 5, a third bus bar 7; a first bus bar extension 37 secured to the first bus bar 3; and a second bus bar extension 38 secured to the second bus bar 5. The first bus bar extension 37 can be removably or fixedly secured to the first bus bar 3; the second bus bar extension 38 can be removably or fixedly secured to the second bus bar 5. It should be understood that the sliding engagement functionality as described herein can be accomplished with not only an outlet but also with a switch or other device.

In one aspect, the first bus bar, the second bus bar, and the third bus bar each have one or more horizontally oriented female sockets adapted to be capable of releasably securing a conductor. In one aspect, the first bus bar 3 is mounted to a back wall 13 of the enclosure 2, the second bus bar 5 is mounted to the back wall 13 of the enclosure, and the third bus bar 7 is mounted to a bottom wall 17 of the enclosure.

In one aspect, the first (e.g. hot) connector extension 39 is adapted to operatively contact the first bus bar extension 37 as the sliding outlet 30 slidingly engages the outlet box 1, the second (e.g. neutral) connector extension 40 is adapted to operatively contact the second bus bar extension 38 as the sliding outlet 30 slidingly engages the outlet box 1, and the third (e.g. ground) connector extension 41 is adapted to operatively contact the third bus bar 7 as the sliding outlet 30 slidingly engages the outlet box 1, whereby the sliding outlet 30 is operatively connected to the outlet box 1 without the need for wire nuts, thus achieving at least one advantage over conventional systems that require wires be connected between the various components.

Figure 8A:
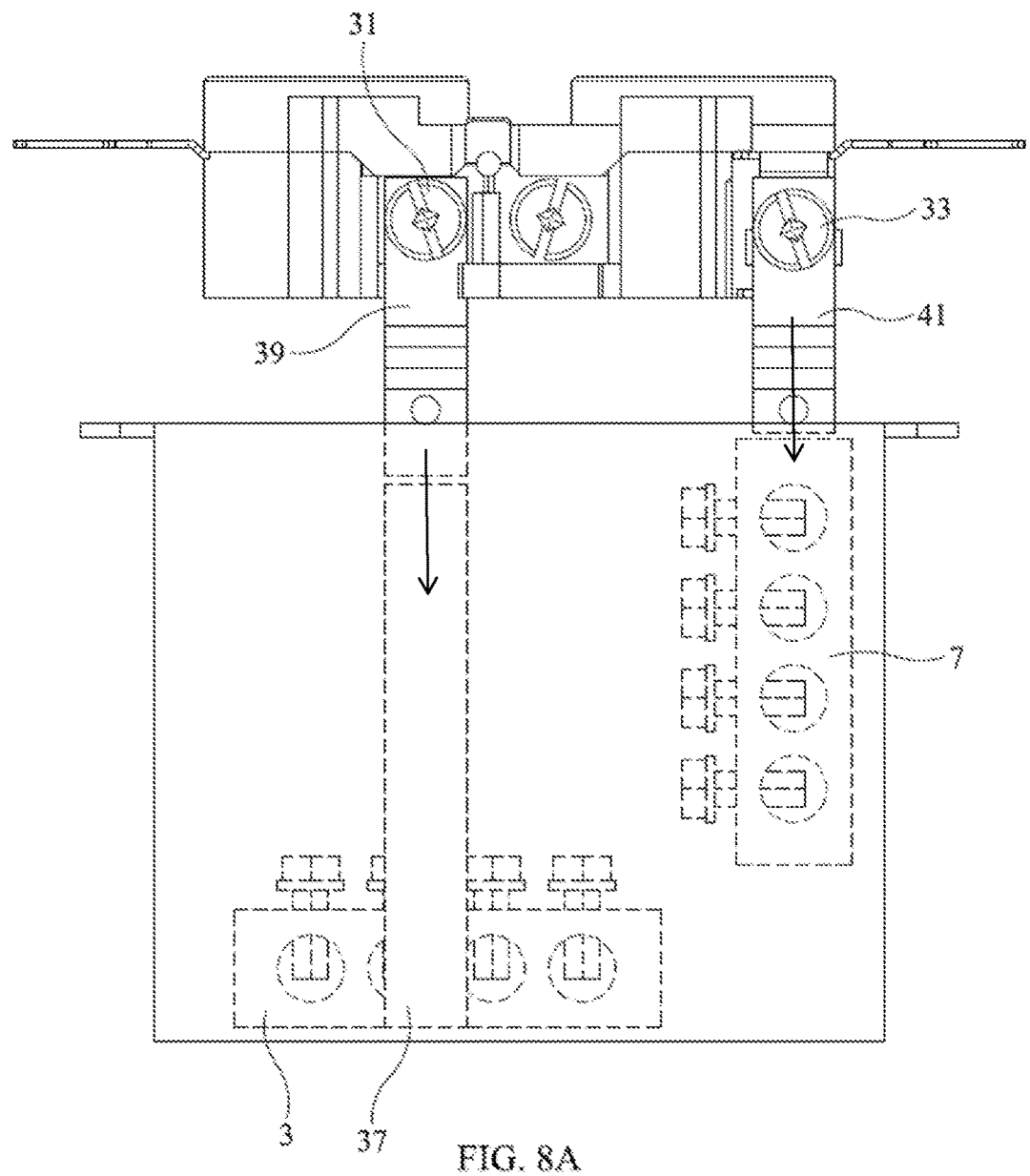

In one aspect, the operative contact between the first connector extension 39 and the first bus bar extension 37, and between the second connector extension 40 and the second bus bar extension 38, and between the third connector extension 41 and the third bus bar 7 is achieved by a friction fit. In one aspect, the friction fit is achieved by placing a bend in each connector extension (e.g. FIGS. 1, 2) so that a sufficient amount of friction exists between the bus bar and/or bus bar extension and the extension section. This topology is depicted in FIG. 8A which shows the sliding outlet 30 slidingly engaging outlet box 1 in the direction of the arrows, wherein the first connector extension 39 is adapted to friction fit to the first bus bar extension 37, and the third connector extension 41 is adapted to friction fit to the third bus bar 7. Although not shown in FIG. 8A, an analogous relationship exists for the second connector extension 40 second bus bar extension 38.

Figure 3:
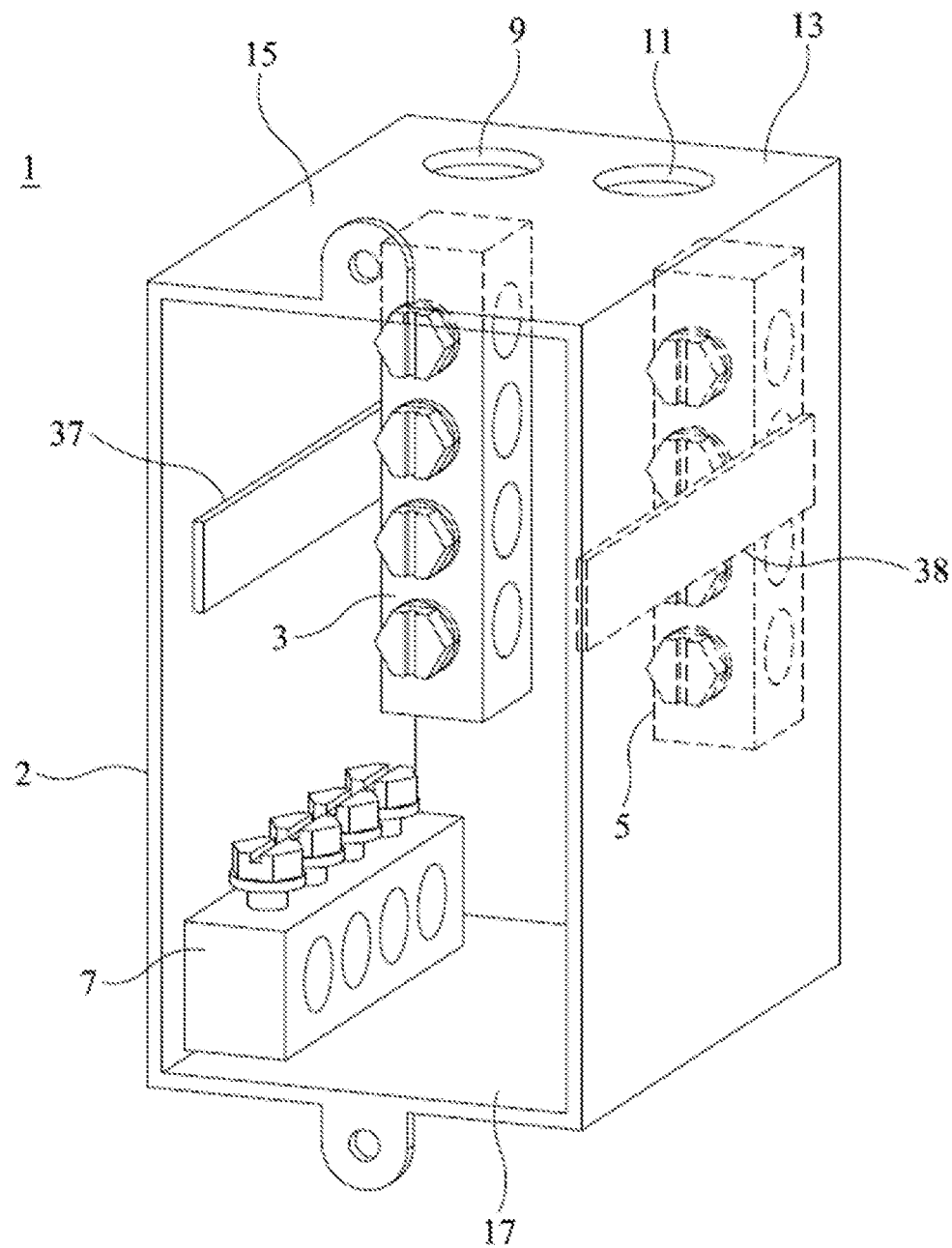

As shown in FIG. 3, apertures 9 and 11 are disposed in top wall 15 and positioned above bus bars 3 & 5, respectively. In one aspect, additional apertures (not shown) are used to facilitate access to set screws 21 (FIG. 5) of third bus bar 7. Such apertures are positioned in top wall 15 to allow a screwdriver to be inserted through such aperture in order to adjust set screws 21.

It should be understood that the designation of bus bars can be changed. For example, in one aspect, first bus bar 3 is the "neutral" conductor, second bus bar 5 is the "hot" conductor, and third bus bar 7 is the "ground" conductor. One advantage of this topology is that the neutral and ground bus bars are in close proximity according to their electrical potential.

Figure 6:
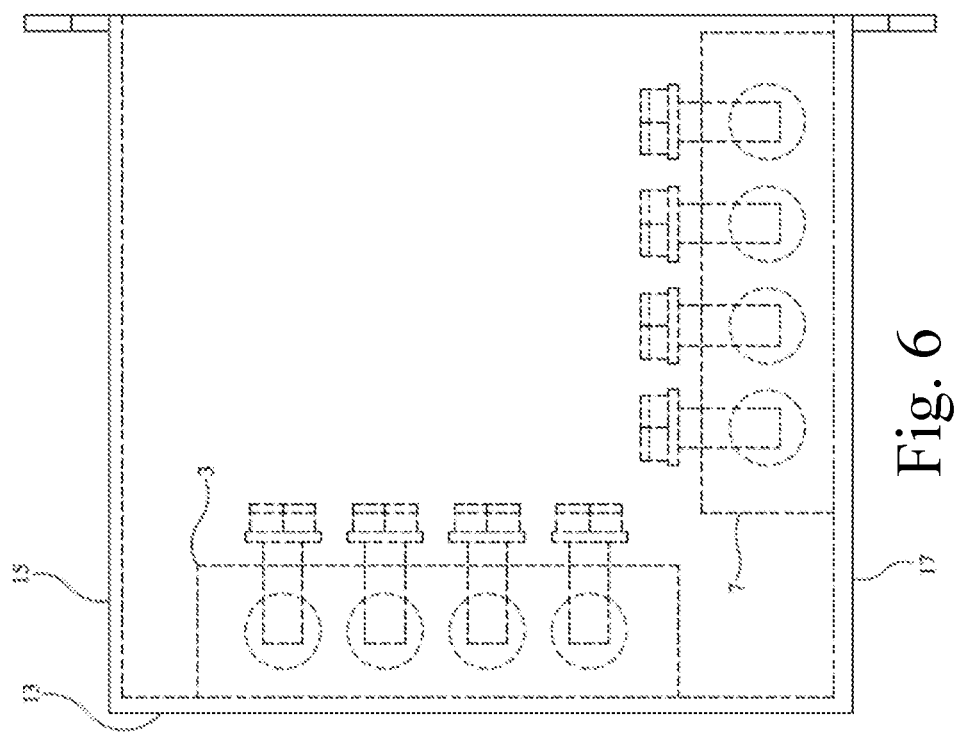
Figure 7:
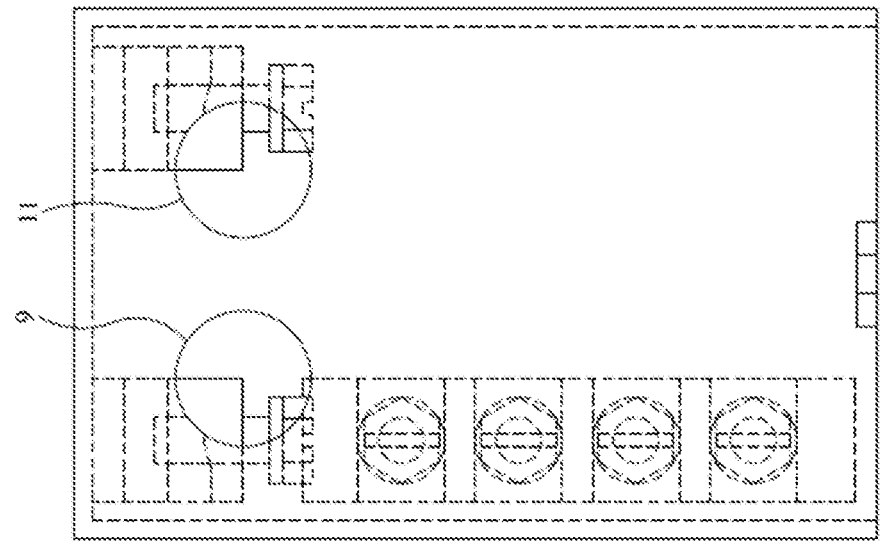
Figure 8B:
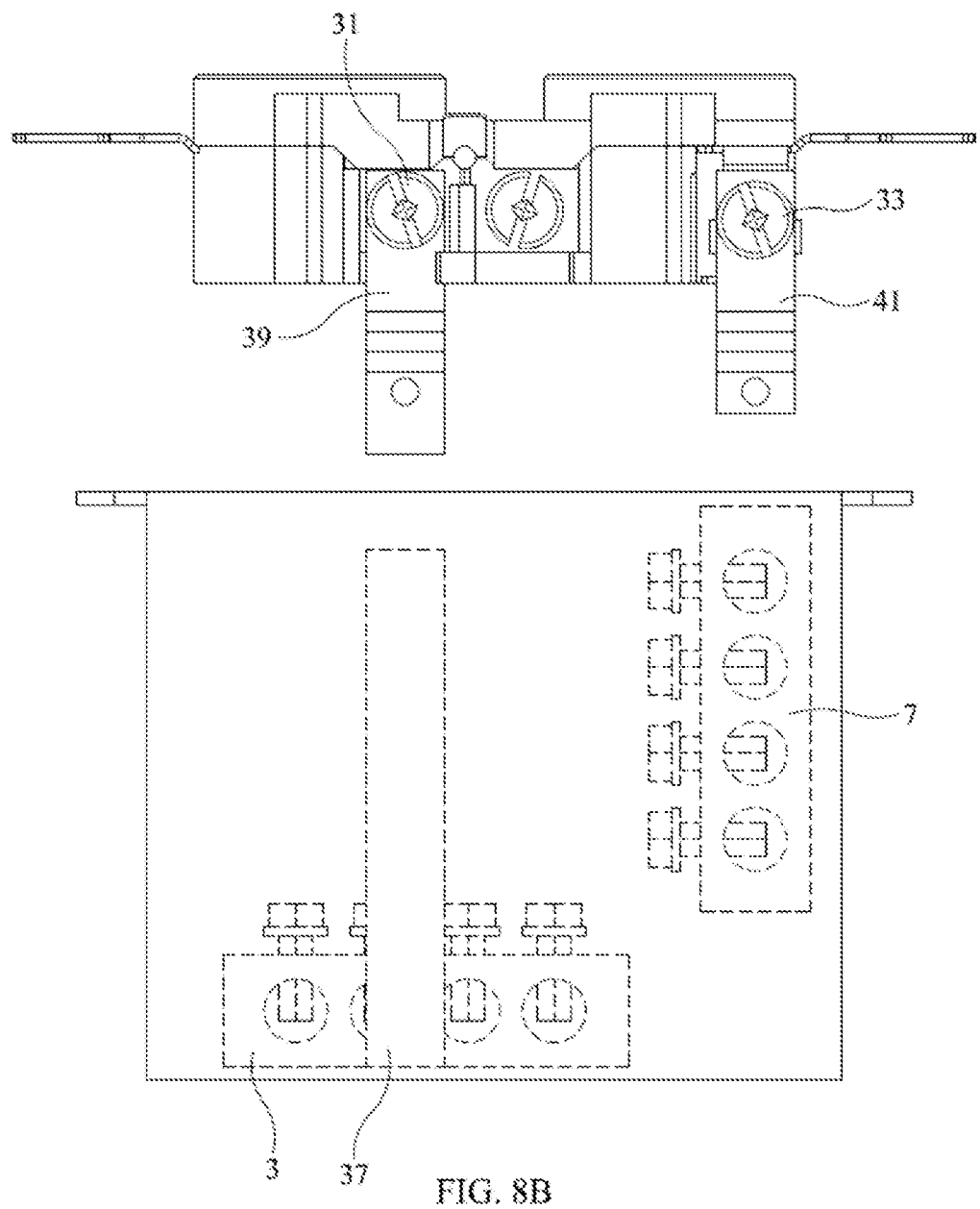

As depicted in FIGS. 3, 6, & 7, third bus bar 7 is disposed, relative to first and second bus bars 3, 5, to extend outwardly from back wall 13 of enclosure 2 whereas first and second bus bars 3, 5 do not extend outwardly. As shown in FIGS. 8A, 8B, this orientation of third bus bar 7 allows third connector extension 41 of outlet 30 to directly operatively engage the third bus bar 7, and thus a bus bar extension is not needed. First and second bus bar extensions 37 & 38 are used in this aspect to engage first and second connector extensions 39 & 40. It should be understood however that considering that the designation of bus bars can be changed, other configurations are possible to eliminate the need for first and/or second bus bar extensions 37, 38 in which case a third bus bar extension could be used in accordance with the various aspects described.

Figure 2:
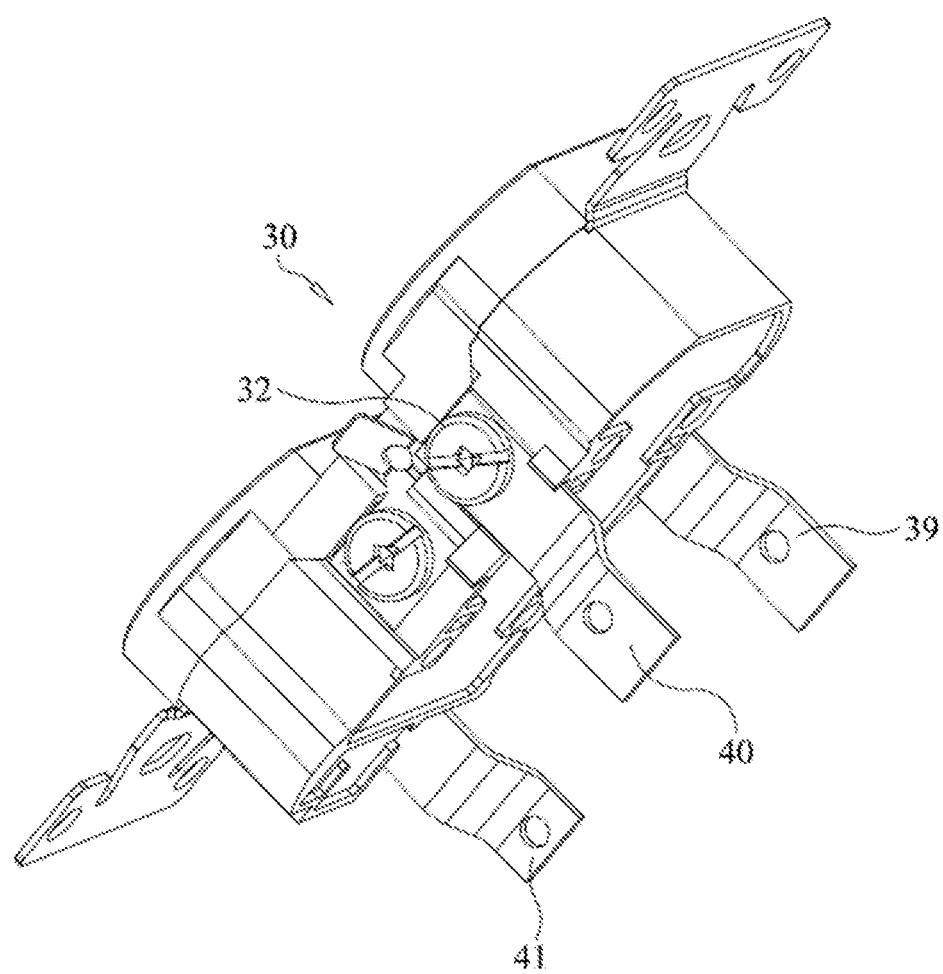
Figure 4:
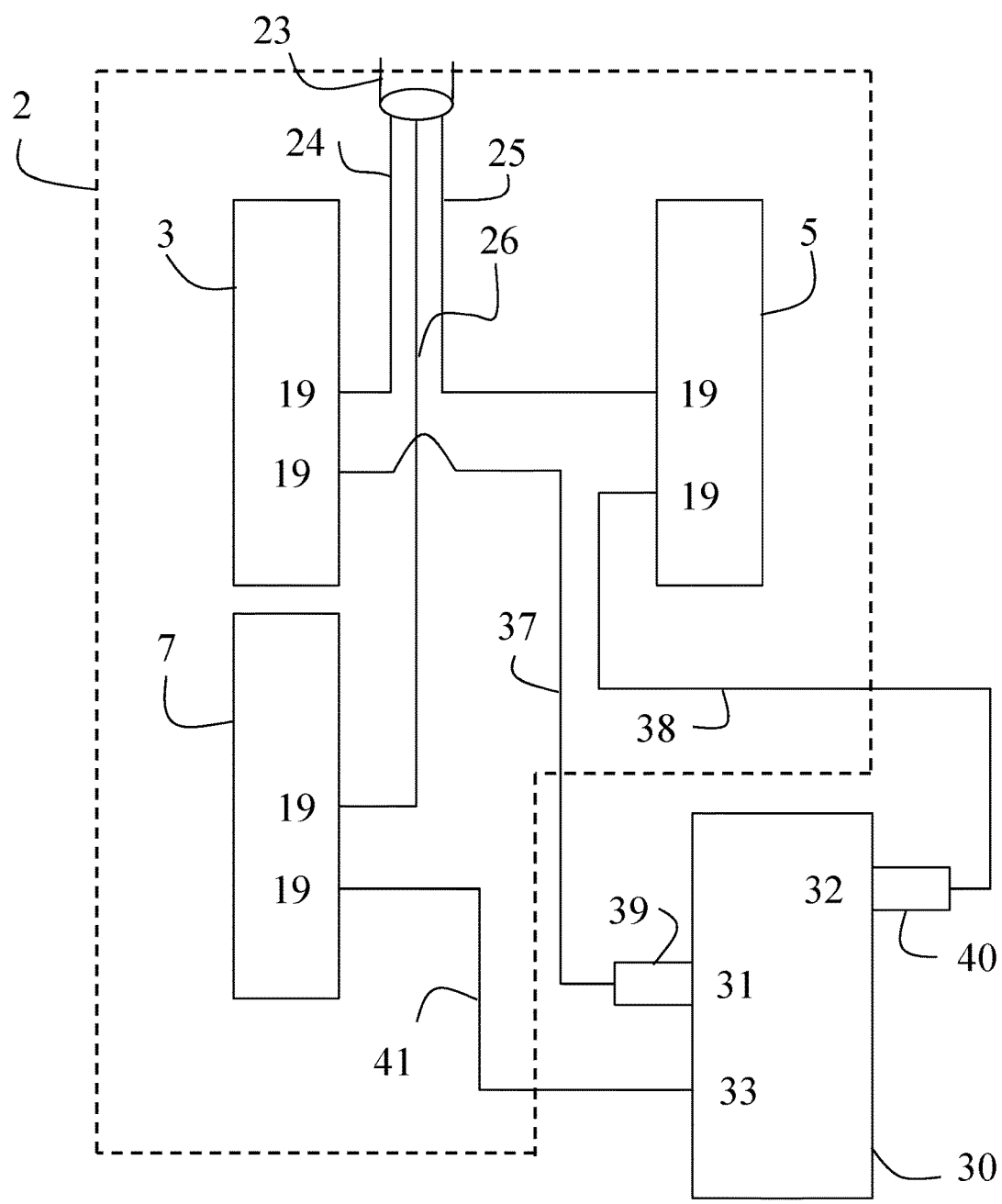

It should be noted that FIG. 4 is a block diagram and thus the depiction of third connector extension 41 as a line is intended to be representative of a structural member third connector extension 41 such as is depicted in FIG. 1 or 2; likewise with first and second bus bar extensions 37 & 38.

In one aspect, a switch box or outlet box 1 consists of an enclosure 2, a first bus bar 3, a second bus bar 5, and a third bus bar 7. A multi-conductor wire can be inserted into the enclosure (through an aperture, discussed elsewhere herein) and then connected to the bus bars.

FIG. 3 depicts enclosure 2, having an open front which exposes first, second, and third bus bars, 5, 7, & 9, respectively. An outlet or switch (e.g. sliding outlet 30) is operatively connected to each of said three bus bars according to the various aspects of the subject technology described herein. Thereafter, the outlet or switch 30 is removably secured to the enclosure 2 by sliding engagement according to the various aspects described herein.

The first bus bar 3, the second bus bar 5, and the third bus bar 7 each have one or more horizontally oriented female sockets 19 adapted to be capable of releasably securing a conductor. In one aspect, a conductor is releasably secured to a female socket with a set screw 21 (e.g. FIG. 5). In another aspect, a friction fit is used. In one aspect (e.g. FIG. 5), the first bus bar 3, the second bus bar 5, and the third bus bar 7, typically depicted in FIG. 5, each have at least three horizontally oriented female sockets 19, each being adapted to be capable of releasably securing a conductor.

In one aspect, the first bus bar 3 is mounted to a back wall 13 of the enclosure 2; the second bus bar 5 is mounted to the back wall 13 of the enclosure 2; and the third bus bar 7 is mounted to a bottom wall 17 of the enclosure 2; the enclosure 2 has a first aperture 9 disposed in a top wall 15 of the enclosure 2. The purpose of the aperture is to allow a conductor (e.g. multi-conductor wire) to be inserted therein for connection to the various bus bars.

Figure 5:
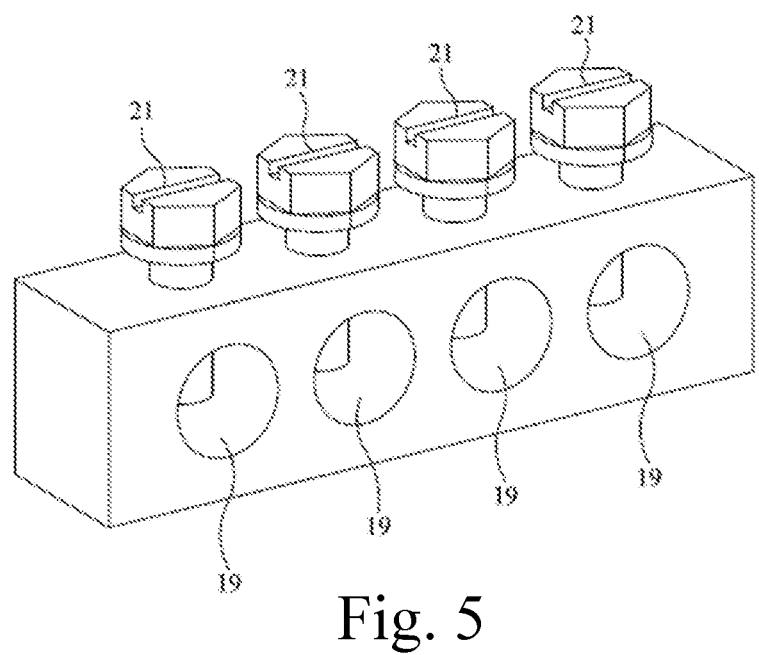
FIG. 5 Depicts a perspective view of a typical bus bar used in accordance with some aspects of the subject technology FIG. 6 Depicts a side view of enclosure 2 in one aspect of the subject technology FIG. 7 Depicts a top view of enclosure 2 in one aspect of the subject technology FIG. 8A Depicts a side view of outlet box 1 being slidingly engaged to outlet 30 in one aspect of the subject technology FIG. 8B Depicts an exploded view of outlet box 1 and outlet 30 in one aspect of the subject technology FIG. 9 Depicts a front view of enclosure 2 with wiring in one aspect of the subject technology FIG. 10A Depicts a front view of an outlet 30 in one aspect of the subject technology FIG. 10B Depicts a rear view of an outlet 30 in one aspect of the subject technology
Figure 9:
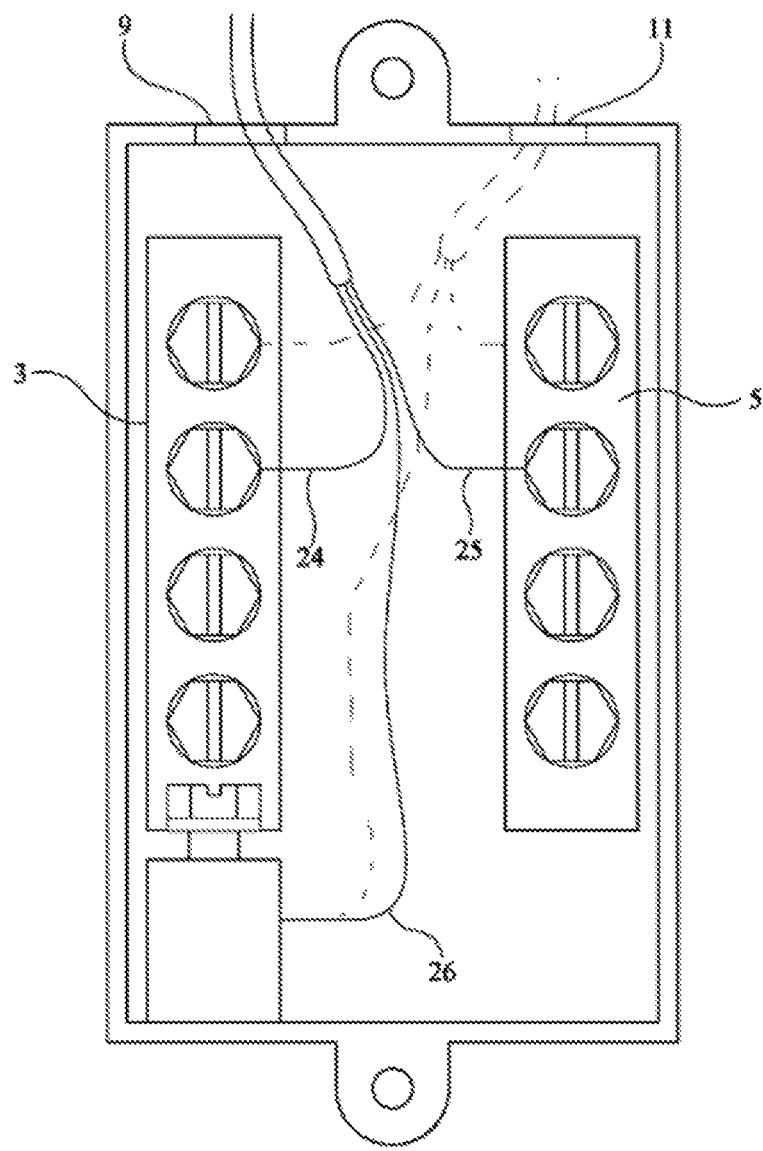
Figure 10A:
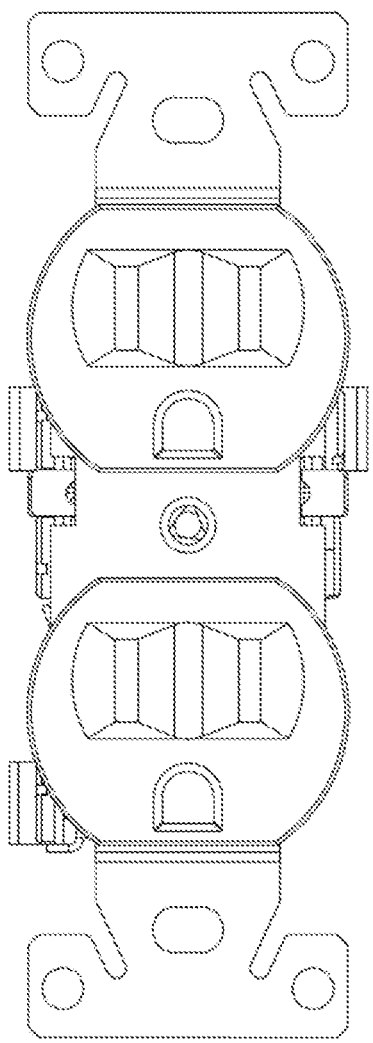
Figure 10B:
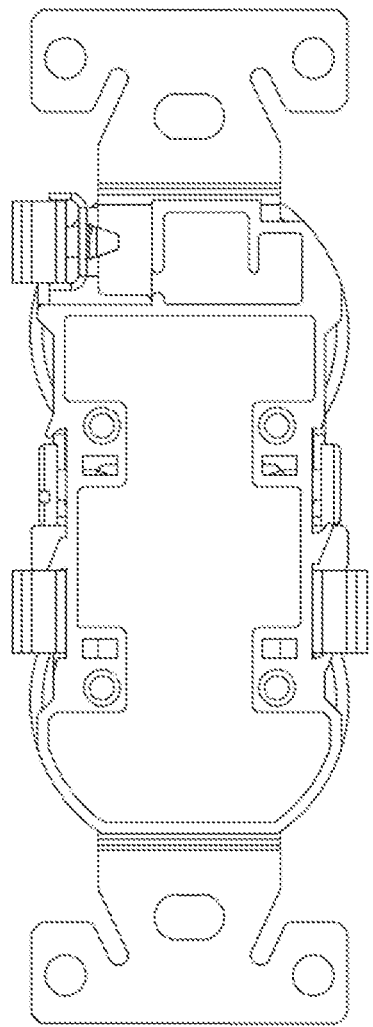

In one aspect, the first aperture 9 is adapted such that a vertically oriented wire 23 is inserted therein. It should be understood that "vertically oriented" and "horizontally oriented", as used herein, are relative terms used to describe the orientation of a conductor (e.g. hot conductor 24) found in wire 23 (e.g. a three conductor, 12 gauge electrical wire such as is used to wire a home) relative to female sockets 19 found in the various bus bars described herein (e.g. bus bar depicted in FIG. 5 showing four such female sockets). For example, a wire 23 having three conductors, hot 24, neutral 25, and ground 26, is inserted into first aperture 9 in a roughly vertical orientation as shown in FIG. 9. Since all three bus bars (first 3, second 5, and third 7) are mounted such that each female socket 19 is horizontally oriented, a given conductor must be bent from a relatively vertical orientation to a horizontal orientation so as to be capable of being inserted within the female socket. It is to be understood that "inserted", in this sense, can include releasable securement with set screws or friction fit.

In one aspect (FIG. 9), the first aperture 9 is aligned with the first bus bar 3; the enclosure 2 has a second aperture 11 disposed in the top wall 15 of the enclosure 2; and the second aperture 11 is aligned with the second bus bar 5. It should be understood that "aligned" as used to describe the relationship of an aperture (9, 11) to a bus bar (3, 5) is intended to describe the physical location so as to be relatively close to a bus bar to allow a wire 23 to be inserted within an aperture such that a conductor (e.g. 24) can be releasably inserted (e.g. by set screws 21 as shown in FIG. 5) within a female socket 19. As shown in FIG. 9, first aperture 9 is aligned with first bus bar 3, and second aperture 11 is aligned with second bus bar 5.

The term "energizing" as used herein, includes wiring or slidingly engaging an electrical component such as a switch or outlet so that electrical power can be delivered to the device. Thus, in this sense, a component can be energized even though electrical power is not being supplied at all times, such as during construction when an outlet is fully connected but the main breaker has not been activated.

An aperture (9, 11) can be disposed in any surface (aka wall) of the enclosure. Depending on the location of the aperture, a conductor may be bent to accommodate insertion into a socket or connection to a connector.

The invention is in no way limited to the specifics of any particular embodiments and examples disclosed herein. For example, the terms "aspect," "example," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:

1. A sliding outlet comprising:
    a first connector extension secured to a first connector, the first connector extension being flat, elongate, and outwardly projecting relative to the first connector;
    a second connector extension secured to a second connector the second connector extension being flat, elongate, and outwardly projecting relative to the second connector;
    and a third connector extension secured to a third connector the third connector extension being flat, elongate, and outwardly projecting relative to the third connector;
    the sliding outlet being adapted to slidingly engage an outlet box, wherein the outlet box consists of:
        an enclosure, a first bus bar, a second bus bar, a third bus bar;
        a first bus bar extension secured to the first bus bar, the first bus bar extension being flat, elongate, and outwardly projecting relative to the first bus bar;
        and a second bus bar extension secured to the second bus bar, the second bus bar extension being flat, elongate, and outwardly projecting relative to the second bus bar;
        wherein the first bus bar, the second bus bar, and the third bus bar each having one or more female sockets formed therethrough adapted to be capable of releasably securing a conductor;
        the first bus bar being mounted to a back wall of the enclosure;
        the second bus bar being mounted to the back wall of the enclosure;
        the third bus bar being mounted to a bottom wall of the enclosure;
        the enclosure having a first aperture disposed in a top wall thereof;
        the first aperture being adapted such that a wire can be inserted therein;
    the first connector extension being adapted to operatively contact the first bus bar extension as the sliding outlet slidingly engages the outlet box;
    the second connector extension being adapted to operatively contact the second bus bar extension as the sliding outlet slidingly engages the outlet box;
    the third connector extension being adapted to operatively contact the third bus bar as the sliding outlet slidingly engages the outlet box;
    whereby the sliding outlet is operatively connected to the outlet box without the need for wire nuts.

2. The switch box or outlet box of claim 1 further comprising:
    the first bus bar, the second bus bar, and the third bus bar, each having at least three female sockets formed therethrough.

3. The switch box or outlet box of claim 1 further comprising:
    the first aperture being aligned with the first bus bar;
    the enclosure having a second aperture disposed in the top wall of the enclosure;
    the second aperture being aligned with the second bus bar.

* * * * *